Aug. 4, 1959   A. CROFT   2,897,935
FRICTION CLUTCHES
Filed April 29, 1957   2 Sheets-Sheet 1

United States Patent Office 2,897,935
Patented Aug. 4, 1959

2,897,935

FRICTION CLUTCHES

Arthur Croft, Rawdon, Leeds, England, assignor to Crofts (Engineers) Limited, Bradford, England, a British company Application April 29, 1957, Serial No. 655,582

1 Claim. (Cl. 192—93)

This invention relates to friction clutches, particularly of the disc type but also of the cone type, having operating mechanism including a disc or cone mounting sleeve carrying an axially slidable operating collar, a retained back plate and a front slidable plate with interposed thrust elements.

In clutches of the above type it is known to use thrust elements in the form of steel balls located between inclined co-operating faces of the back and front plates. Such balls are adapted to be forced radially inwardly by the stepped or cam shaped interior of the collar to cause the front plate to apply pressure to the discs or cones. On a return movement of the collar, spring means release the clutch. Spring or mechanical means are usually provided to take up wear in the clutch members.

The main object of this invention is to provide a simple improved construction of the operating mechanism.

Accordingly there is provided a friction clutch of the above type, including operating mechanism incorporating barrel-shaped roller elements spaced equi-distant about the clutch axis and located between the opposite faces of the retained back plate and front slidable plate, said roller elements being located in radial guide grooves in one or both of the said faces, each groove having its inner bearing face curved transversely to be complementary to the longitudinal curvature of the roller elements to provide full rolling contact, each element riding over at least one inclined transversely curved bearing face for clutch operation purposes.

The improved construction may have radially disposed guide grooves on both of the operating plate faces with the transversely curved bearing faces of the grooves in one plate at right angles to the clutch axis and the opposite transversely curved roller bearing faces inclined to provide clutch operation. Also, the front slidable plate may carry a screwed adjusting collar to allow for wear in the clutch parts.

Referring now to the accompanying drawings in which an embodiment of the invention is shown:

Figure 1:
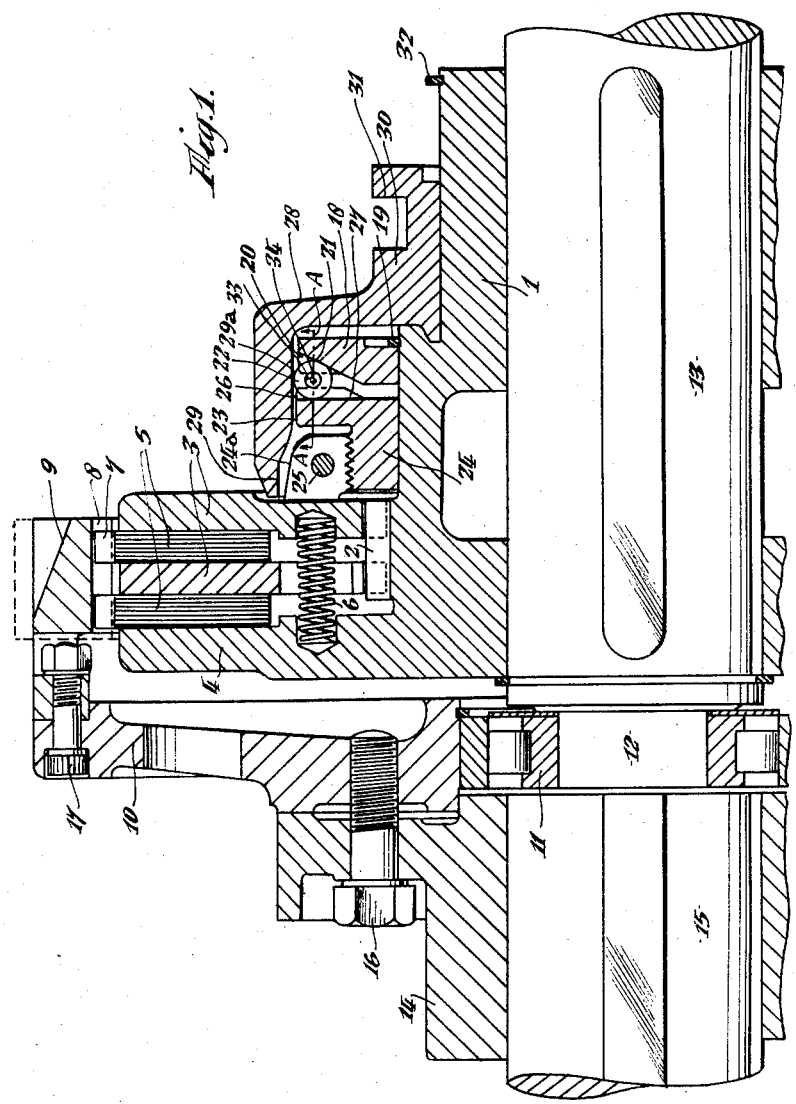
Fig. 1 is a sectional side elevation of part of a disc clutch with the improved operating means.
Figure 2:
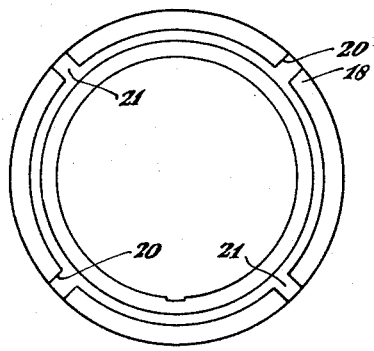
Fig. 2 is a face view of the back plate.
Figure 3:
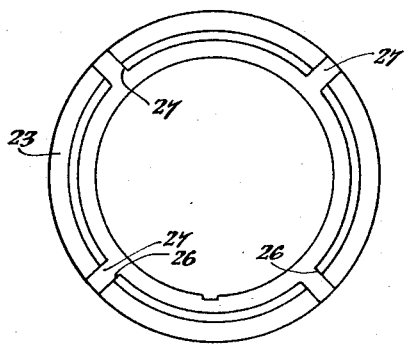
Fig. 3 is a face view of the front plate.
Figure 5:
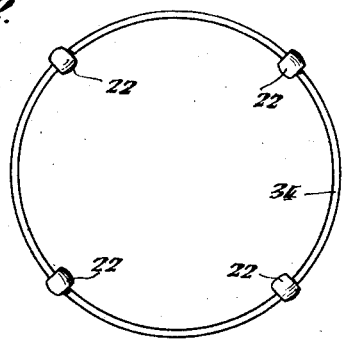
Fig. 5 is a view of a roller assembly.
Figure 6:
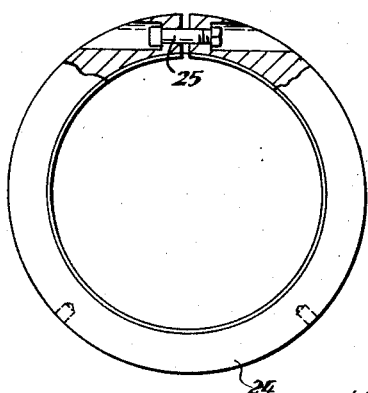
Figure 6 is an elevational view of the adjusting collar.
Figure 4:
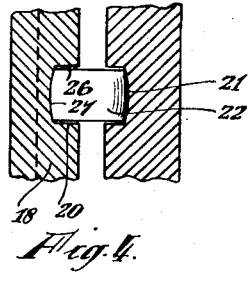
Fig. 4 is a sectional view on line A—A of Fig. 1.
Figure 7:
Figure 7 is a sectional view of the adjusting collar.

The clutch illustrated is generally according to known construction and includes a body hub part 1 with teeth 2 thereon in driving connection with the movable pressure plates 3. Said hub has an integral pressure plate 4 and friction discs 5 are interposed between the three pressure plates with return springs 6 between the outer plate 3 and fixed plate 4. These discs have peripheral teeth 7 engaging the internal teeth 8 of the clutch rim 9 which is detachably secured to the outer clutch member 10 mounted on the roller bearing 11 carried by the reduced end 12 of the shaft 13 on which the hub 1 is keyed. The member 10 is detachably secured to the coupling 14 which is freely mounted on the other shaft 15.

The discs 5 are preferably split for ease in renewal and the fabrication of the second part of the clutch from a detachable rim 9 and member 10 assists this renewal without any dismantling of the shafting. Moreover, the construction enables the alignment of the shafts to be checked after the clutch has been assembled as when the securing bolts 16 and screws 17 are removed the member can be moved axially for checking purposes. This feature is an advantage as it is essential to have true alignment for a correct clutch assembly.

The clutch is furnished with improved operating means including a back re-action plate 18 mounted on the hub 1 and retained by a spring ring 19. The plate is furnished with radially disposed grooves 20 having inclined bearing faces 21 which are curved transversely to be complementary to the barrel-shaped roller thrust elements 22. Adjacent this plate 18 is a front plate 23 forming part of a pressure distance piece 24 having a screwthreaded external surface upon which is threadably mounted the adjusting collar 24a. The latter is split so that it can be clamped by a bolt 25 when set to suit the pressure plate 3 it bears against. This front plate 23 also has radial roller element guide grooves 26 with transversely curved bearing faces 27, but in this instance the faces 27 are at a right angle to the clutch axis. A hollow operating collar 28 surrounds the above clutch operating parts and is furnished with an internal stepped cam profile 29 engaging the roller elements 22. The boss 30 of this collar is grooved at 31 to receive a stirrup, a ball bearing element, or other operating means and a spring retaining ring 32 is provided to limit its disengaging travel.

To facilitate assembly and removal of the roller elements 22, they each have an axial hole 33 and are fitted on to a deformable retaining spring 34 or other ring type retaining means.

In this improved arrangement each element 22 has a longitudinal curvature which is complementary to the circumference, or average circumference, of the substantially cylindrical part 29a of the stepped cam profile 29 of the operating collar 28, i.e., where the profile is smallest in diameter for thrusting the elements to their innermost position. As stated, the bearing faces 21, 27 of the aforesaid guide grooves are made complementary transversely to the curvature of the barrel-shaped thrust elements and thus there will always be true rolling line contact and equalized thrust.

It will be understood that when the operating collar 28 is moved axially towards the discs 5 its interior profile 29 will ride over the thrust elements 22 and force them radially inwardly down the radial guide grooves and due to the inclination of the bearing faces 21 of the plate 18, will thrust the front plate 23 to cause frictional engagement of the clutch discs. The clutch incorporates return springs 6 in known manner so that when the operating collar is withdrawn disengagement will take place automatically. With this construction at least the parts of the operating mechanism may be simple machineable parts and so the whole arrangement facilitates production with less wear on bearing faces.

It will be understood the clutch may be modified, say by providing spring adjustment instead of screwed adjustment to take up wear in the clutch automatically. Also, the improved operating mechanism is suitable for cone-type clutches.

What I claim is:

In a friction clutch connecting axially-aligned driving and driven shafts, a hub mounting secured to said driving shaft, said hub mounting having a first pressure plate clutch element rigidly connected thereto and a second pressure plate clutch element slidably mounted on said hub mounting for axial movement with respect thereto, said driven shaft having friction discs connected thereto and extending intermediate said first and second pressure plates, spring-loading means normally urging said pressure plates apart, and mechanical operating means for urging said second pressure plate toward said first pressure plate; the improvement wherein said mechanical operating means comprises a pair of annular members coaxially mounted on said hub mounting, a first one of said annular members being secured to said hub mounting and the second of said annular members being axially slidably movable on said hub mounting relative to said first annular member, said second annular member being intermediate and spaced from both said first annular member and said second pressure plate element, said annular members having an equal number of radially disposed and oppositely-arranged guide grooves formed in the opposing faces thereof, each of said grooves having throughout its length a curved cross-sectional configuration, the grooves of one of said annular members having bearing faces which are radially outwardly inclined with respect to the plane of the opposing face of the other of said annular members, a plurality of barrel-shaped rollers intermediate the oppositely-arranged grooves of said annular members, the longitudinal axes of said rollers being perpendicular to the axes of the associated grooves and said rollers having peripheral configurations identical with the cross-sectional configurations of said grooves, each of said rollers having a longitudinal bore extending therethrough, a deformable annular retaining element extending through the bores of each of said rollers, said second annular member having a screw-threaded outer peripheral portion at that end thereof adjacent said second pressure plate, a split adjusting collar threadably connected to the threaded peripheral portion of said second annular member, said collar bearing against said second pressure plate element, and an operating collar slidably mounted on said hub mounting for axial movement with respect thereto, said collar surrounding said annular members and having an internal cam profile the section of smallest diameter of which is substantially cylindrical and arranged to urge the rollers radially inwardly in their grooves upon axial movement of said operating collar to displace the movable annular member away from the stationary annular member and thereby effect clutch engagement of the clutch pressure plate elements.

References Cited in the file of this patent
UNITED STATES PATENTS

| | | |
|---|---|---|
| 1,585,140 | Erban | May 18, 1926 |
| 2,386,013 | Swenson | Oct. 2, 1945 |
| 2,506,713 | Fast | May 9, 1950 |
| 2,639,015 | Wolf | May 19, 1953 |
| 2,702,107 | Hahn | Feb. 15, 1955 |